US008775920B2

(12) United States Patent
Eilers et al.

(10) Patent No.: US 8,775,920 B2
(45) Date of Patent: Jul. 8, 2014

(54) SYSTEM AND METHODS FOR DISPLAYING USER MODIFIABLE SERVER-RENDERED IMAGES

(75) Inventors: Laban Eilers, Framingham, MA (US); Jay T. Moody, Wayland, MA (US)

(73) Assignee: VistaPrint Schweiz GmbH, Winterthur (CH)

( * ) Notice: Subject to any disclaimer, the term of this patent is extended or adjusted under 35 U.S.C. 154(b) by 381 days.

(21) Appl. No.: 13/205,079

(22) Filed: Aug. 8, 2011

(65) Prior Publication Data
US 2011/0296296 A1    Dec. 1, 2011

Related U.S. Application Data

(62) Division of application No. 11/854,480, filed on Sep. 12, 2007, now Pat. No. 7,996,756.

(51) Int. Cl.
*G06F 17/00* (2006.01)

(52) U.S. Cl.
USPC ........................................................ 715/205

(58) Field of Classification Search
USPC ......... 715/205, 206, 208, 221, 243, 246, 230, 715/255
See application file for complete search history.

(56) References Cited

U.S. PATENT DOCUMENTS

| 7,667,862 | B2 * | 2/2010 | Ziegler et al. | 358/1.13 |
| 8,078,969 | B2 * | 12/2011 | Harrison | 715/732 |
| 8,447,067 | B2 * | 5/2013 | Rhoads et al. | 382/100 |
| 2001/0026277 | A1 * | 10/2001 | Dorrell | 345/474 |
| 2002/0113812 | A1 * | 8/2002 | Walker et al. | 345/719 |
| 2004/0100486 | A1 * | 5/2004 | Flamini et al. | 345/723 |
| 2004/0148340 | A1 * | 7/2004 | Cotte | 709/203 |
| 2007/0162841 | A1 * | 7/2007 | Bailey et al. | 715/505 |
| 2007/0188488 | A1 | 8/2007 | Choi | 345/419 |
| 2007/0204223 | A1 * | 8/2007 | Bartels et al. | 715/540 |
| 2011/0026777 | A1 * | 2/2011 | Rhoads et al. | 382/107 |
| 2011/0066658 | A1 * | 3/2011 | Rhoads et al. | 707/803 |

FOREIGN PATENT DOCUMENTS

WO    WO 01/84501    11/2001    ............. G06T 15/00

* cited by examiner

*Primary Examiner* — Laurie Ries

(74) *Attorney, Agent, or Firm* — Sunstein Kann Murphy & Timbers LLP

(57) ABSTRACT

A system and method permits design of customized items on a client device using a web page. The client device receives a web page from a web server that includes, among other things, a design document encoding graphic elements that completely characterize a design image. The client device receives edits to the graphic elements, and sends a modified design document back to the server. The server then uses the design document to render an image, and sends to the client the server-rendered image for display in the web page. The web page may define an area in which to display the server-rendered image. The server may use a database to store the rendered image and use it in completing a customer order.

28 Claims, 4 Drawing Sheets

SYSTEM AND METHODS FOR DISPLAYING USER MODIFIABLE SERVER-RENDERED IMAGES

CROSS-REFERENCE TO RELATED APPLICATIONS

This application is a divisional application of co-pending application Ser. No. 11/854,480, filed Sep. 12, 2007, the contents of which are hereby incorporated by reference herein in their entirety.

TECHNICAL FIELD AND BACKGROUND ART

This invention relates to serving a multitude of users over an open network with server rendered real-time revised images, and more particularly, to the rendering of composite product images from initial product images and user revisions of custom design images.

Printing services web sites which allow a user to access the site from a computer located at the user's home or work and design and purchase an item of apparel, such as a t-shirt or other item, are well known and widely used by many consumers and businesses. Typically, these printing services sites allow the user to first review stock images of the various products that are available from the provider. When the user selects a specific product to customize, the sites typically provide online tools allowing the user to provide the text that the user desires to appear on the customized product. The user is also typically allowed to either upload a full color image from the user's computer to be incorporated into the product design or select from a number of decorative designs, images, and other graphic elements that are provided for the user's use by the printing services provider. Images of the user text entries and the user-selected decorative elements, collectively referred to herein as "design images" are combined with the basic product image to create a composite image indicating the appearance of the printed product. When the design is completed to the user's satisfaction, the user can place an order through the site for production of a desired quantity of the corresponding printed product using a computer-to-textile printing system.

To avoid customer frustration with the customization process, it is desirable that the web site timely respond to user input, particularly in the display of a composite product image. Such timeliness may be severely challenged when the rendering software runs on the server of the printing services provider. The rendering operation may be computationally intensive, and require special software not found on a typical customer's computer. For example, a process of rendering images in a manner that blends the colors of the design image with the underlying color of the product may add to the computational complexity. As customers' computers vary in their processing capabilities, it is difficult to determine how long rendering might take, and therefore difficult to gauge customer satisfaction with the process. In addition, the rendering software may be proprietary, difficult to install, or incompatible with the client hardware or operating system. For these reasons, rendering a design image with a product image may preferably be done not on a customer's computer, but on a computer controlled by the printing services provider.

This choice of rendering location leads to its own set of delays. Information about the design must be transferred from the user's computer to the services provider and the rendered image must be transferred back. This process incurs a delay as the data travels through the Internet, from one computer to another until it reaches its destination. Use of the computer network delays timely responses to user input. More significantly, with regard to a central printing services provider serving many thousands of users over the Internet, delays can be incurred due to simultaneous demands on the central server to access its database for data required to render images. The typical mechanism for updating a server-rendered image to reflect changes made in a browser involves making two requests to the server. The first request sends information about changes made to the design to the server, which is subsequently written to a data store such as a database. In the second request, the browser typically sends a unique identifier for the user's document to the server, which renders the image. In particular, in HTML an IMG tag that calls for an image supports a GET which has limited data size and is thus unable to send all of the data needed to characterize a design. The unique identifier, however, can be easily sent to the server in a GET.

When a multitude of users are accessing the printing services provider, at the same time calling for use of the rendering software, delays are typically encountered. As users simultaneously revise their custom designs, many thousands of periodic updates to the database are required. Each time a user makes a change to her design, storing and retrieving the design data incurs a delay, as well as incurring additional I/O and computational expense on the servers. In a popular system, such frequent accessing of the database can result in noticeable delays that users may find frustrating. In addition, some printing service providers use the database for purposes other than storing image data, such as taking customer orders. Satisfying these other purposes further taxes the system providing the database, increasing delays.

To minimize customer frustration with non-responsive or slow web sites, and to minimize the risk of losing customers due to this frustration, it is highly desirable that the printing service provider supply a composite image quickly after user input. There is therefore a need for systems and methods which render composite product images for a multitude of users without causing frustrating delays for the users.

SUMMARY OF THE INVENTION

With regard to customers, there is provided a method for designing customized items in accordance with embodiments of the invention. A user views a web page containing a visual representation of a design to be printed on a customized item, an editor for modifying the design, and a form for sending design changes to a web server and targeting a defined area of the web page. Then the user manipulates the editor to modify the design. The form is activated to send a design document containing the updated properties of the design from the client computer to the web server. The client computer receives, and then displays a customized image in the defined area of the web page. Optionally, the user makes more changes using the editor, and repeats the process. When finished, the user may optionally submit notice that the process is complete, and submit an order for a product depicted by the customized image.

A system embodiment of the invention takes orders for customized items and renders images of the items as customized by a user. The system contains a web server and a database. The web server is programmed to provide a customer with web pages defining areas for displaying a visual representation of the design and a server-rendered composite image. The server is programmed to render and provide to the respective defined area composite images in response to receiving complete image state data from the client. The server is further configured to receive from the customer's client computer a design document that represents the current design. The database is capable of storing design documents that represent final design images. After this information is stored, it can be retrieved from the database in order to complete a customer order for the customized item.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

It will be understood that, while the discussion herein describes an embodiment of the invention in the field of preparation of customized design images and product images, the invention is not so limited and is relevant to any application for displaying user modifiable server-rendered images on a web page.

One system with which the invention may be employed allows a user to modify a design, and view with only a minimal delay a server-rendered preview of a product printed bearing that design. A web server provides the user with a web page written using HTML. As used herein "HTML" includes HTML and HTML derivatives, such as DHTML or XHTML. The web page contains a browser-based graphical editing application implemented using a browser-based technology such as AJAX, JavaScript, or Flash.

The web page may contain user specific information describing the complete or partial state of the user's design. Alternatively, this data can be loaded by the editing application in one or more subsequent requests to the server. This data is encoded in using XML, JSON, or any other data format. The web page additionally contains an IFRAME element (either defined in markup or created dynamically) which is used as a container to display a server-rendered, composite image of the final design-bearing product.

When the user makes a change determined to be significant by the editing application, it initiates an HTTP POST request to the server via a FORM element (either defined in markup or created dynamically) containing all information about the state of the design necessary to render it on the server. In other words, the final product image can be advantageously rendered without requiring the server to store or retrieve from storage, data related to the state of the design document. In response to this request, the server returns a rendered image representing the product's state, based on the data provided in the POST request. This POST request is targeted at the window contained in the IFRAME element, which allows the image to be displayed in the browser, imitating the visual effect of an IMG element. The use of the IFRAME advantageously allows the request for the image to be made in a single POST, whereas an IMG element, which supports only HTTP GET, cannot submit enough data to the server to allow the server to statelessly render the image.

Figure 1:
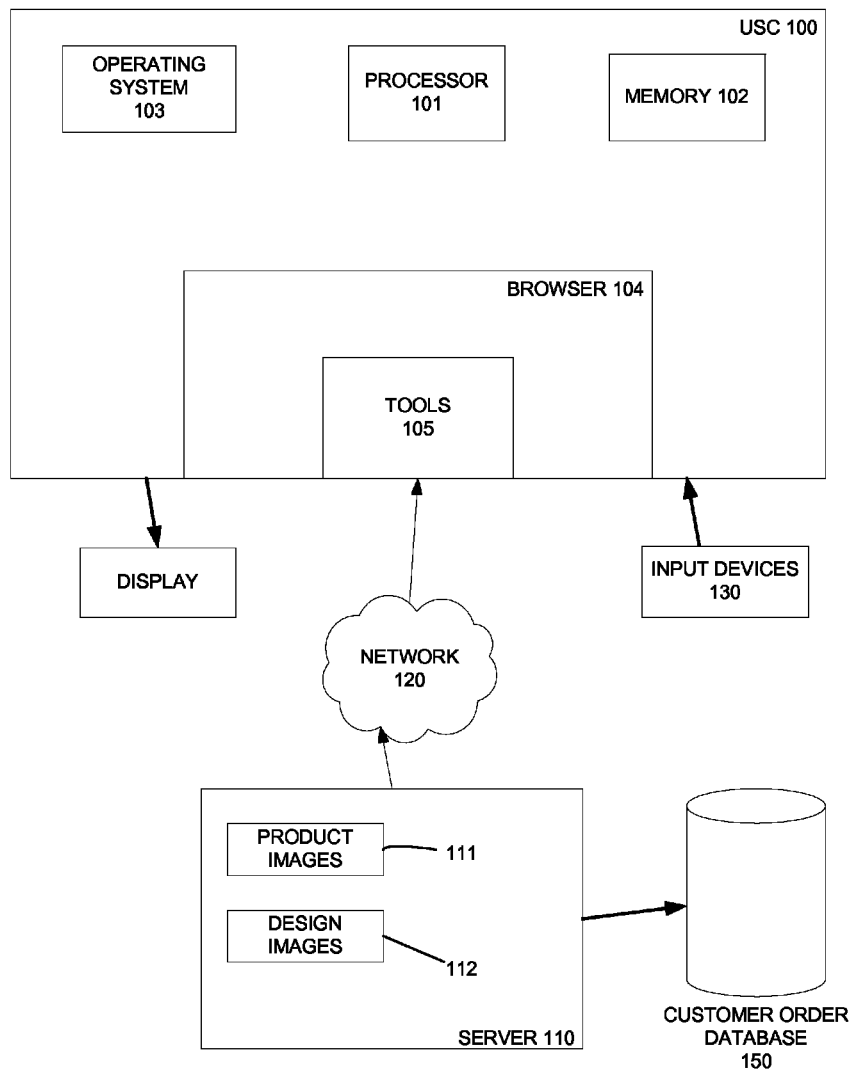
FIG. 1 shows an illustrative system with which the invention may be employed.

FIG. 1 illustrates one system with which the invention may be employed. User computer system UCS 100 includes processor 101 and memory 102. Memory 102 represents all UCS 100 components and subsystems that provide data storage for UCS 100, such as RAM, ROM, internal and external hard drives, and other computer readable media. In addition to providing permanent storage for all programs installed on UCS 100, memory 102 also provides temporary storage required by the operating system and any application program that may be executing. In the embodiment described herein, UCS 100 is a typically equipped personal computer, but UCS 100 could also be any other suitable device for interacting with server 110, such as a portable computer, a tablet computer, a wireless handheld device, or a computer system particularly adapted or provided for electronic product design, such as a product design kiosk, workstation or terminal. The user views images from UCS 100 on display 140, such as a CRT or LCD screen, and provides inputs to UCS 100 via input devices 110, such as a keyboard and a mouse.

When UCS 100 is operating, an instance of the UCS 100 operating system, for example a version of the Microsoft Windows operating system, will be running, represented in FIG. 1 by operating system 103. In FIG. 1, UCS 100 is running a web browser 104, such as, for example, Internet Explorer from Microsoft Corporation. In the depicted embodiment, tools 105 represent product design and ordering programs and tools downloaded to UCS 100 via network 120 from remote server 110, such as downloadable product design and ordering tools provided by VistaPrint Limited and publicly available at VistaPrint.com. Tools 105 run in browser 104 and exchange information and instructions with server 110 during a design session to support the user's preparation of a customized product. When the customer is satisfied with the design of the product, the design and customer order information can be uploaded to server 110 for storage in database 150 for subsequent printing and post-print processing (not depicted).

While server 110 is shown in FIG. 1 as a single block, it will be understood that server 110 could be multiple servers configured to communicate and operate cooperatively to support web site operations. Server 110 will typically interact with many user computer systems, such as UCS 100, simultaneously. Server 110 includes the components and subsystems that provide server data storage, such as RAM, ROM, and disk drives or arrays having stored thereon the various computer programs, product layouts, designs, colors, fonts, and other information to enable the creation and rendering of electronic product designs.

In the embodiment discussed herein, server 110 includes a number of stored images of various products, such as photographic images of various shirts, pens, mugs and other items available for customization and purchase, collectively depicted in FIG. 1 as product images 111. Server 110 also retains a plurality of images and graphic elements that are available for the user to select and add to the user's item design for customization purposes. These decorative images and graphics are collectively indicated in FIG. 1 as design images 112. While shown in FIG. 1 as two blocks, it will be understood that product images 111 and design images 112 could be stored in a single memory device or distributed across multiple memory devices. Tools 105 allow the user to select a desired design image 112 and create a personalized design by adding text or resizing, repositioning, or otherwise modifying elements of the selected design. When an updated image of the user's custom product is required, tools 105 will transfer to server 110 a design document (not shown). The design document contains a description of the initial selected design image, together with the user's text entries and other user customization information sufficient to describe the current state of the design. During the design process, tools 105 retains the information required by the server to render the user's current customized design. Server 110 can create a composite image representing the customized product by combining the user's custom design, as described by the design document received from UCS 100, with the appropriate image from product images 111. During this process server 110 need not read any design data from database 150.

While interacting with server 110 to create a custom product design, the user is typically presented with one or more screen displays (not shown) allowing the user to select a type of product for customization and then review thumbnail images of various design images prepared by the site operator and made available for incorporation into the product design by the user. To provide the customer with a wide range of design choices, each design image may comprise a combination of graphics, images, color schemes, and/or other design elements. The service provider also pre-selects one or more default fonts to be used to render any text entered by the user. When a product and a design image have been selected by the user for customization, an initial product design page is downloaded from server 120 to UCS 100.

Figure 2:
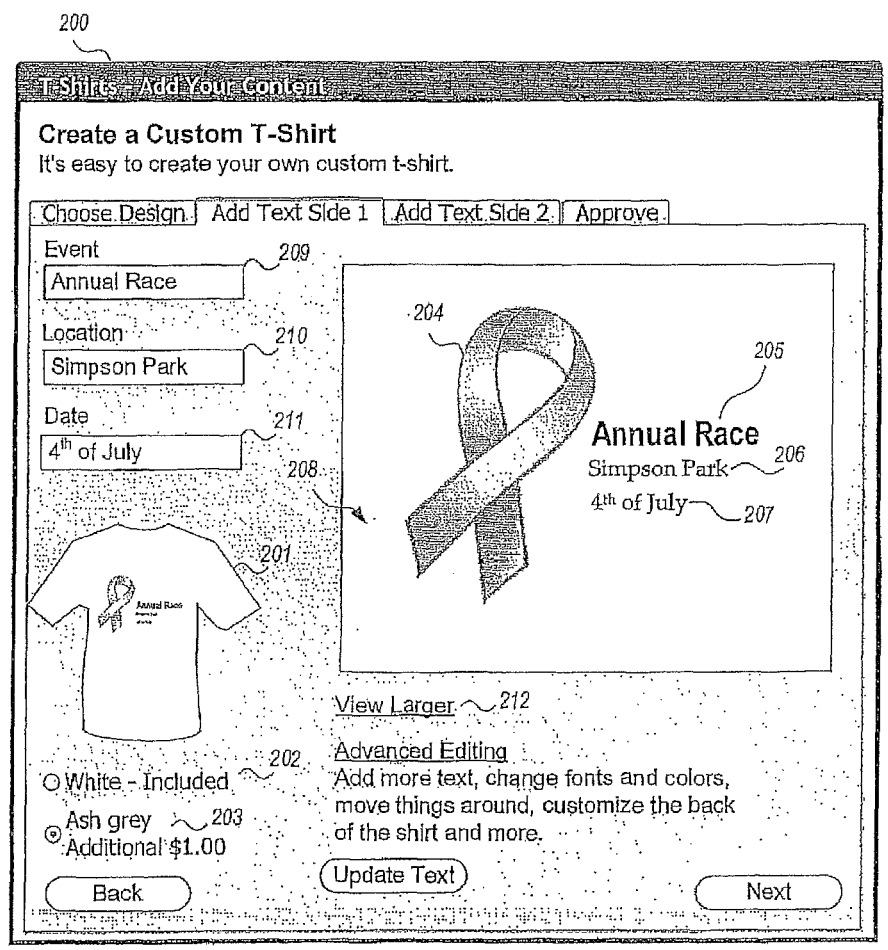
FIG. 2 shows the product display web page during the product customization process undertaken by a user.

FIG. 2 depicts an illustrative embodiment of product design page 200. Product image 201 shows the selected product in combination with the design image and indicates the appearance of the finished printed product. In FIG. 2, product image 201 is an image of an ash gray t-shirt, corresponding to the color selection indicated by radio button 203. Radio button 202 is provided to allow the user to select a white shirt, if desired. Additional radio buttons, or other selection mechanisms, for additional color choices could be employed if desired.

In this example, the design that will be printed on the shirt is the combination of ribbon image 204 and three text images 205-207 displayed on edit area 208. Edit area 208 has an ash gray background, as indicated by radio button 203. With a printing system that is not adapted to print the color ash gray, the background color is not printed, and the surface of the fabric underlying the background area will be visible.

Text entry fields 209-211 are provided to allow the user to enter whatever characters the user desires to appear on the shirt in the areas 205-207. The characters entered by the user could include letters, numbers, punctuation marks or other symbols as supported by the site operator. All characters of all types entered by the user are collectively referred to herein as "text". Images corresponding to the user's text are created at UCS 100 and rendered by tools 105 at the appropriate locations 205-207 relative to ribbon 204. In the depicted example, the user has entered information into text entry fields 209-211, and the edit area 208 reflects this information. A service provider may initially provide default text images 205-207 with placeholder text, such as "Event Name", "Location", and "Date", to give the user an indication of the relative size and location of where and how the user's text entries will appear. Product image 201 incorporates the user's text entries and indicates the gray shirt color chosen by the user. Because of the relatively small size of product image 201, "view larger" link 212 is provided to allow the user to request the displaying of a larger image of the customized product (not shown). The page 200 may further include a link 213 to a design image editor for more advanced editing of the properties of the graphic elements.

The product design page document is typically formatted using a markup language. Common markup languages include hypertext markup language (HTML), extensible markup language (XML), and wireless markup language (WML). Such markup languages allow computers to process complex documents, such as web pages. These markup languages allow a web designer to break a document into pieces, and encode each piece with a markup tag which represents some functional aspect of the information contained in the piece.

In particular, the HTML markup language includes several HTML tags which work together to provide product design page functionality. HTML includes a FORM tag, which gathers information from a user using familiar elements such as radio buttons, check boxes, and text input areas, and submits that information to a web server. HTML also includes an IMG tag, which requests image data stored at a specified location on the Internet for display in the web browser. For more general functionality, HTML defines an IFRAME tag, which defines an inline frame, or area within a web page, for requesting and displaying any sort of formatted data, including other web pages. In addition, HTML defines a DIV tag, which divides a web page into divisions or sections for formatting purposes.

A typical embodiment of the product design page 200, formatted using the HTML markup language, will include tags formatted such as those as in Appendix A. The document begins with the tag <html>, which signifies to a web browser that the document is encoded using the HTML markup language. The document is broken into two major pieces, a body and a head. The document ends with the tag </html>.

The document body specifies information about the page that should be displayed by the web browser. The body begins at the <body> tag and ends at the </body> tag. The body illustrated in Appendix A contains three immediate sub-tags: <iframe>, <form>, and <div>. It will be understood that a typical embodiment of the product design page 200 will contain many more such tags for displaying other components of the page. The body contains an <iframe> tag for defining an area, which in accordance with embodiments of the invention will display a server-rendered image. The tag requests the image from the location denoted by the "src" attribute. The <iframe> tag as illustrated is named "imageFrame".

The body contains a <form> tag, which signifies an HTML form for collecting design information and submitting it to a web server. Typically, when a form submits data to a web server, the server will respond with new content for refreshing the display in the browser window. Here, the web server responds with image data. However, the illustrated <form> tag uses the "target" attribute to request the browser to display the returned image data in the frame named "imageFrame", rather than using the entire browser window. Thus, display of a composite product image can be advantageously updated without refreshing the entire browser window. The <form> tag contains an "action" attribute, which specifies the location on the Internet to which the collected image state data should be submitted. The image state data itself is shown inside the form in a hidden input named "documentState", denoted by the <input> tag. The form itself is named "documentState-Form". This name is used by another part of the page to populate the form with image state data.

The body also contains a <div> tag, for providing an image editor. The image editor uses a scripting language such as JavaScript to display a design and to populate the form with design state data. The editor contains JavaScript (not shown) which activates the "changeImage" JavaScript function located in the document head, in response to a change in the design.

The document head specifies information about the page that is not directly displayed, but is helpful to the browser. The head begins at the <head> tag and ends at the </head> tag. The document head markup illustrated in Appendix A includes a <script> tag, which informs the browser that scripting information follows until a </script> tag is found. In the illustrated embodiment, the scripting language is JavaScript, although it will be understood that other browser-supported scripting languages may be used. The illustrated script contains the function "changeImage". It will be understood that a typical product design page may contain a plurality of scripting functions in the page head, so as to provide other page functionality. The "changeImage" function receives from the image editor a design document containing design state information, denoted here by "newState". It locates the form named "documentStateForm" within the document body. It updates the form's "documentState" input with the new design state value, "newState". Then it activates the form using the form's "submit" function, which causes the form to submit all of its data to the web server defined by the form's "action" attribute.

Figure 3:
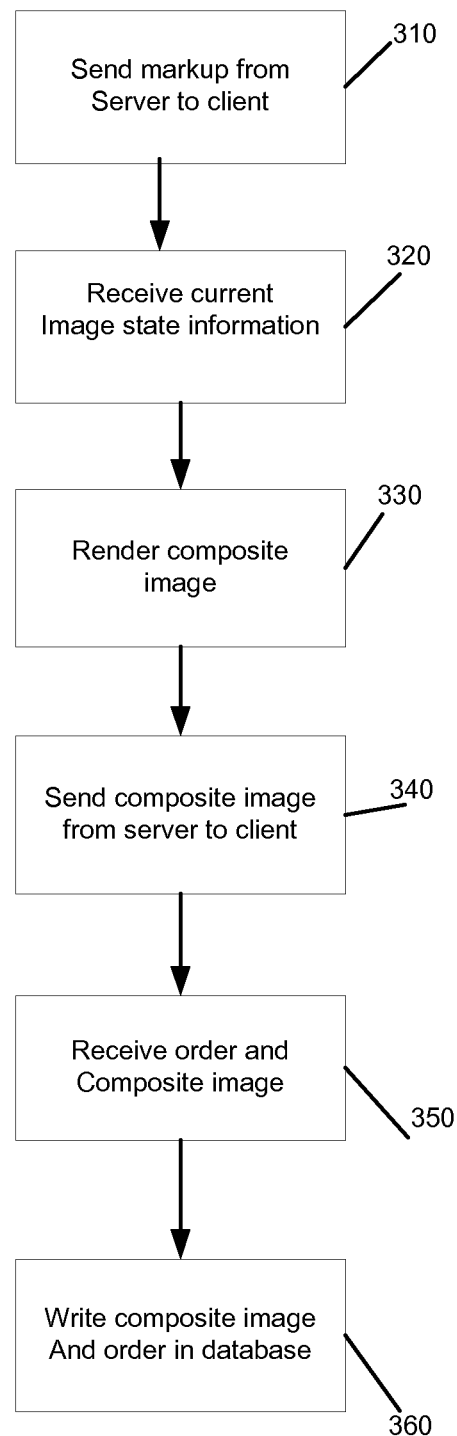
FIG. 3 depicts a flowchart embodying actions taken by a server of FIG. 1.

FIG. 3 depicts actions taken by the server 110 to allow UCS 100 to display a customized image in web browser 104. This method involves the exchange of formatted data between the server 110 and the client UCS 100. The server 110 provides the client UCS 100 with images and web pages. Images are typically stored in such common formats as JPEG (and PNG). Browser 104 can interpret and display these images on display 140. Web pages are typically stored as text, encoded using a markup language. Browser 104 can decode this markup language and display the information stored in the web page in familiar fashion.

The client UCS 100 provides the server 110 with a design document and customer order information. These types of information may be encoded using a markup language such as XML, or using another data format which server 110 is configured to accept and decode. A typical data format, commonly generated by a browser 104 in response to user entering data into a form, encodes each piece of data in the format "key=value", where "key" is the name of an option and "value" is the value of the option.

In response to a browser request for the assigned URL, the server 110 sends 310 to client UCS 100 a product design web page, such as that illustrated by product design page 200. This product design page is encoded using a markup language that browser 104 can interpret and decode. The markup language data includes at least the description of the design to be displayed in edit area 208, a first markup tag for use by the client in sending a design document and a second markup tag defining an area of the product design page for displaying a server-rendered image. Markup tags are defined or created dynamically by the markup language data. Commonly, this markup language will be HTML, but it will be understood that the invention may use other markup languages. Using HTML, the first markup tag is a FORM tag and the second markup tag is a IFRAME. The IFRAME defines an area such as that occupied by product image 201. Although the IFRAME is typically used to define an area for another web page, here it has been used to display a server-rendered image. The IFRAME can be advantageously targeted by the FORM. Browser 104 interprets the information contained in the marked up product design page, and displays it for a user on display 140.

The server 110 receives a design document along with the identity of a defined area of the web page 320 from the client UCS 100. This occurs after the client UCS 100 initiates a data transfer, typically by submitting a form. In the illustrated embodiment, the form is encoded using an HTML FORM which targets an IFRAME defining the defined area of the web page. This may happen during any pause as the user alters data in a form or otherwise edits the design image, if the web page employs dynamic scripting using a language such as JavaScript. The design document may encode the position, orientation, color, and all other graphical properties of the text and design images 112 required to draw a complete item design. This information may be encoded using XML, JSON, or another data format such as key-value pairing. The server receives from UCS 100 all required information about the current state of the design needed to create a composite custom product image by combining the received design with the associated product image from product image 111.

The server 110 renders 330 a composite image using the design document received from the FORM. This composite image depicts the appearance of a product bearing the design images as described by the received design document. The server 110 may render the image in a single memory device, or the design document may be dispatched to one or more other memory devices for rendering. In certain preferred embodiments, the rendering may utilize certain techniques to blend the design colors onto the product colors in a manner so as to accurately represent the appearance of the finished product. Such techniques are described by U.S. patent application Ser. No. 11/735,838, filed Apr. 16, 2007, entitled "Representing a Printed Product Using Image Blending", which is hereby incorporated by reference herein.

The server-rendered composite image is sent 340 from server 110 to the client UCS 100, for interpretation by browser 104 and display on device 140 in the area defined by the targeted IFRAME. Advantageously, all the information needed by the server is provided in the FORM to render the image and send it to the defined area. There is no need to store or retrieve the current design document to or from a database. The server can continue to repeatedly 370 receive design documents, render composite images and send the composite images to the client targeting the area defined by the IFRAME. In this manner, a user refines the product design.

When the product design is complete, the server 110 may optionally receive 350 from the client UCS 100 notice that the design process is complete and a final design document. The server 110 then writes this final design document into a database 150. Further, the server 110 may receive 360 a customer order for production of a desired quantity of the corresponding printed product. In response, the order information is written into a database 150. The data contained within the database, including the final design document, is later utilized to produce and process the order (not shown).

Figure 4:
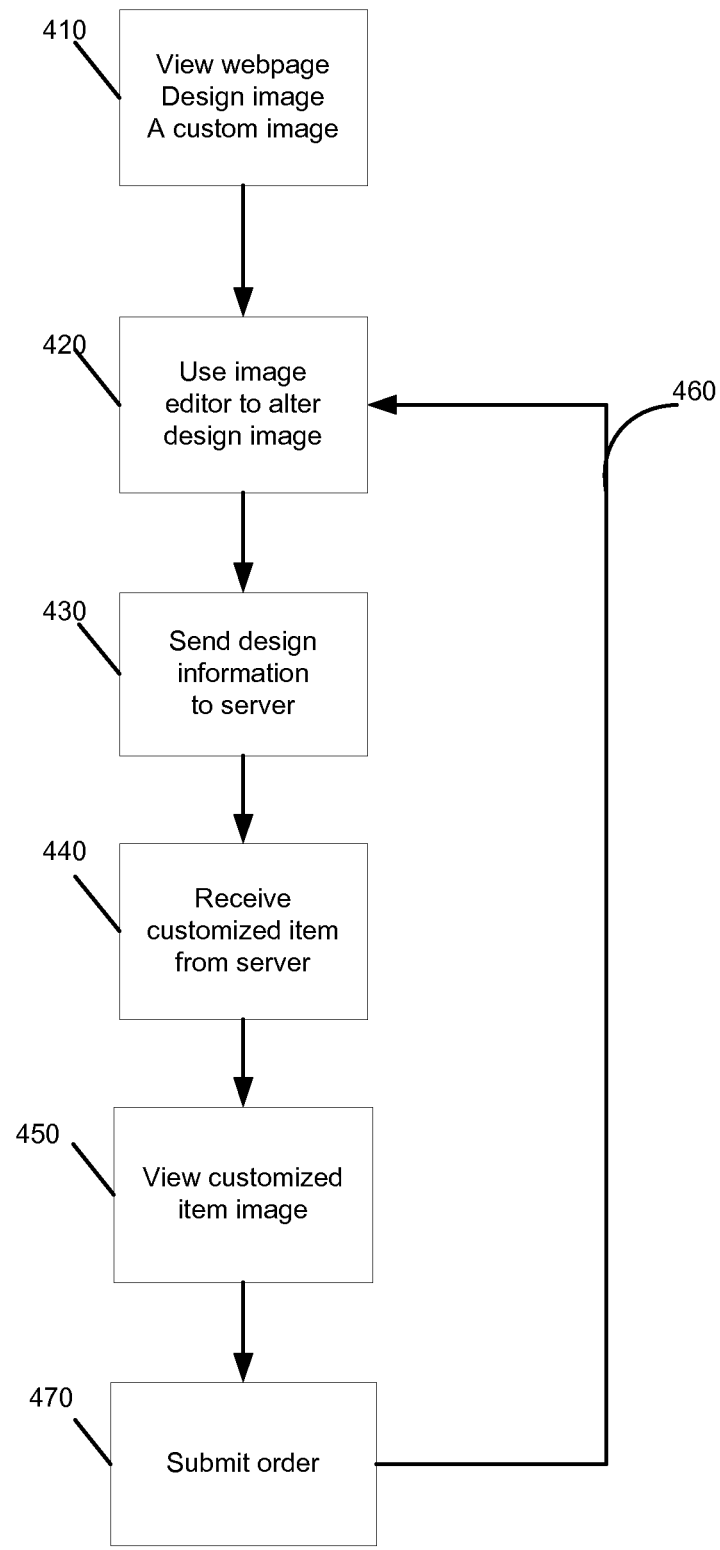
FIG. 4 depicts a flowchart embodying actions taken at the user computer system of FIG. 1.

Referring now to FIG. 4, at the client a user of the UCS 100 interacts with a product design page, defined by a markup language such as HTML, containing a design image, a composite image of a product bearing that design, and a form for submitting the design image information to the service provider. The form advantageously targets an area of the product design page for display of the composite image. Thus, the form is used to refresh the composite image without needing to refresh the entire web page. Typically, the user will begin the design process by selecting a product and a thumbnail design from a selection page (not shown) created by a service provider. Once the user has made this choice, the browser 104 will retrieve 410 from server 110 a product design page, such as that illustrated by product design page 200. The user views this web page, which contains an edit area 208 containing a visual representation of an uncustomized design, and an initial product image in location 201.

The user edits the design by using controls on the product design page, such as text entry fields 209-211. As the user edits the design 420, the product design page reflects those changes visually. For example, if the user enters text into text entry fields 209-211, the product design page updates text images 205-207 accordingly. Editing a design can be accomplished in several ways, including entry of text; selecting fonts or colors from pull-down menus, color palettes, or other data entry mechanisms; clicking and dragging design graphics to relocate them; and other methods. It will be understood that the invention is not limited to these listed methods of editing, but includes all similar methods of editing graphics within a web page. The design image is rendered locally by the user's computer for display on the page.

The product design page sends 430 a design document containing design information to server. In a preferred embodiment, the design document is sent in a FORM. The FORM advantageously uses the POST method, which allows the entire design document to be submitted. The product design page may initiate the data transfer without user intervention through the use of dynamic scripting using a language such as JavaScript. For example, the page may submit the design image information after a pause or a certain amount of time has passed since the last user interaction with the design controls. In an alternative embodiment, the user may initiate the data transfer by activating a control on the product design page, such as by clicking a "submit" button.

The browser 104 receives 440 a server-rendered image from server 110 for display in the area targeted by the FORM. In preferred embodiments, the image is a composite image showing the user-customized design appropriately combined with a product image 111 to give the user an indication of how the final printed product will appear. Browser 104 will display 450 this image 201 on the product design page 200 in the targeted area set aside for this purpose. In a preferred embodiment, the area is defined by the IFRAME.

If the user wishes to make further changes to the design, the user may repeat the process again 460. As the user edits the design image, forms are sent to the server to obtain updated images of the product combined with the design. Once the user is satisfied, she may optionally submit 470 a notice that the design process is finished, so that the server may store the final design. The user may then optionally submit an order 480 for a desired quantity of the printed item as depicted by the composite product image 201.

Of course, it should be understood that various changes and modifications to the preferred embodiment described above will be apparent to those skilled in the art. For example, the use of an IFRAME to display user modifiable images rendered at the server can be applied to a wide variety of products and images. Moreover, a web page displaying a locally edited design for combining remotely with another image may be accomplished in other programming languages similar to HTML. These and other changes can be made without departing from the spirit and scope of the invention and without diminishing its attendant advantages. It is therefore intended that such changes and modifications be covered by the following claims.

APPENDIX A

```
<html>
  <head>
    <script language="JavaScript">
      function changeImage(newState)
      {
        var form = document.getElementById("documentStateForm");
        form.elements["documentState"].value = newState;
        form.submit( );
      }
```

APPENDIX A-continued

```
    </script>
  </head>
  <body>
    <iframe id="imageFrame" name="imageFrame"
src="image_generator.aspx?initialstate=1">
    <form name="documentStateForm" method="POST"
action="image_generator.aspx" target="imageFrame">
      <input type="hidden" value="" name="documentState">
    </form>
    <div id="divEditor"> ... </div>
  </body>
</html>
```

What is claimed is:

1. A method of designing customized items comprising:
   a. receiving from a web server a web page containing (i) a design document encoding graphic elements having properties, (ii) a first server-rendered composite image of an item bearing a design characterized by the graphic elements, and (iii) a form for sending properties of the graphic elements to the web server, the form targeting a defined area of the web page;
   b. displaying the web page using a display device;
   c. receiving edits to the properties of the graphic elements;
   d. sending a modified design document to the web server using the form, the modified design document including (i) data that reflect the received edits and (ii) all image state information necessary to render a composite image;
   e. receiving a second server-rendered composite image of the item from the web server, the second server-rendered composite image having been rendered using the sent modified design document; and
   f. displaying the second server-rendered composite image of the item in the area of the web page targeted by the form.

2. A method according to claim 1, wherein the defined area of the web page is defined by an IFRAME.

3. A method according to claim 1, wherein the web page comprises a link to a design image editor for editing the properties of the graphic elements.

4. A method according to claim 1, further comprising repeating steps (c)-(f) to change the customized image.

5. A method according to claim 1, further comprising submitting notice to the web server that the process of customization is complete.

6. A method according to claim 1, further comprising submitting order information to the web server to purchase a customized item bearing the design characterized by the graphic elements.

7. A user computer system for designing customized items comprising:
   an input device;
   a display device; and
   a processor configured to:
      a. receive, from a web server, a web page containing (i) a design document encoding graphic elements having properties, (ii) a first server-rendered composite image of an item bearing a design characterized by the graphic elements, and (iii) a form for sending properties of the graphic elements to the web server, the form targeting a defined area of the web page;
      b. cause the web page to be displayed using the display device;
      c. receive, from the input device, edits to the properties of the graphic elements;

d. send a modified design document to the web server using the form, the modified design document including (i) data that reflect the received edits and (ii) all image state information necessary to render a composite image;

e. receive, from the web server, a second server-rendered composite image of the item, the second server-rendered composite image having been rendered using the sent modified design document; and f. cause the second server-rendered composite image of the item to be displayed, using the display device, in the area of the web page targeted by the form.

8. A system according to claim 7, wherein the input device, display device, and processor comprise one of a personal computer, a portable computer, a tablet computer, a wireless handheld device, a product design kiosk, a workstation, or a computer terminal.

9. A system according to claim 7, wherein the web page comprises a link to a design image editor for editing the properties of the graphic elements.

10. A system according to claim 7, wherein the processor is further configured to repeat steps (c)-(f) to change the customized image.

11. A system according to claim 7, wherein the processor is further configured to submit notice to the web server that a process of customization is complete.

12. A system according to claim 7, wherein the processor is further configured to submit order information to the web server to purchase a customized item bearing the design characterized by the graphic elements.

13. A computer program product for designing customized items comprising a non-transitory computer readable medium on which is stored computer program code for:

a. receiving from a web server a web page containing (i) a design document encoding graphic elements having properties, (ii) a first server-rendered composite image of an item bearing a design characterized by the graphic elements, and (iii) a form for sending properties of the graphic elements to the web server, the form targeting a defined area of the web page;

b. displaying the web page using a display device;

c. receiving edits to the properties of the graphic elements;

d. sending a modified design document to the web server using the form, the modified design document including (i) data that reflect the received edits and (ii) all image state information necessary to render a composite image;

e. receiving a second server-rendered composite image of the item from the web server, the second server-rendered composite image having been rendered using the sent modified design document; and f. displaying the second server-rendered composite image of the item in the area of the web page targeted by the form.

14. A product according to claim 13, wherein the defined area of the web page is defined by an IFRAME.

15. A product according to claim 13, further comprising program code for activating a link in the web page to a design image editor for editing the properties of the graphic elements.

16. A product according to claim 13, further comprising program code for repeating steps (c)-(f) to change the customized image.

17. A product according to claim 13, further comprising program code for submitting notice to the web server that the process of customization is complete.

18. A product according to claim 13, further comprising program code for submitting order information to the web server to purchase a customized item bearing the design characterized by the graphic elements.

19. A method of customizing items for purchase, the method comprising:

a. providing, to a client device, a product design web page containing (i) a design document encoding graphic elements having properties, (ii) a first rendered composite image of an item bearing a design characterized by the graphic elements, and (iii) a form for sending properties of the graphic elements to the web server, the form targeting a defined area of the web page;

b. receiving, from the client device using the form, a modified design document that includes (i) data that reflect edits to the properties of the graphic elements and (ii) all image state information necessary to render a composite image;

c. rendering a second composite image of the item using the received modified design document; and d. sending the rendered second composite image of the item to the client device for display in the area of the web page targeted by the form.

20. A method according to claim 19, wherein the defined area of the web page is defined by an IFRAME.

21. A method according to claim 19, further comprising repeating steps (b)-(d) until a design process is complete.

22. A method according to claim 19, further comprising:

receiving, from the client device, a final design document and a customer order for production of a customized item corresponding to the final design document; and writing the design document and customer order into a database for production of the customized item.

23. A system for customizing items for purchase, the system comprising:

a web server programmed to:

provide, to a client device, a web page containing (i) a design document encoding graphic elements having properties, (ii) a first rendered composite image of an item bearing a design characterized by the graphic elements, and (iii) a form for sending properties of the graphic elements to the web server, the form targeting a defined area of the web page, receive, from the client device using the form, a modified design document that includes (i) data that reflect edits to the properties of the graphic elements and (ii) all image state information necessary to render a composite image, render a second composite image of the item using the received modified design document, and send the rendered second composite image of the item to the client device for display in the area of the web page targeted by the form; and a database for storing a final design document and a customer order for use in producing the customized item.

24. A system according to claim 23, wherein the defined area of the web page is defined by an IFRAME.

25. A computer program product for customizing items for purchase comprising a non-transitory computer readable medium on which is stored computer program code for:

a. providing, to a client device, a product design web page containing (i) a design document encoding graphic elements having properties, (ii) a first rendered composite image of an item bearing a design characterized by the graphic elements, and (iii) a form for sending properties of the graphic elements to the web server, the form targeting a defined area of the web page;

b. receiving, from the client device using the form, a modified design document that includes (i) data that reflect edits to the properties of the graphic elements and (ii) all image state information necessary to render a composite image;

c. rendering a second composite image of the item using the received modified design document; and d. sending the rendered second composite image of the item to the client device for display in the area of the web page targeted by the form.

26. A product according to claim 25, wherein the defined area of the web page is defined by an IFRAME.

27. A product according to claim 25, further comprising program code for repeating steps (b)-(d) until a design process is complete.

28. A product according to claim 25, further comprising program code for:

receiving, from the client device, a final design document and a customer order for production of a customized item corresponding to the final design document; and writing the design document and customer order into a database for production of the customized item.

* * * * *